June 16, 1942.  R. S. BRESCKA ET AL  2,286,335

INDICATOR

Filed March 13, 1940

INVENTORS
R. S. BRESCKA
E. C. SCOTT

BY E. R. Nowlan

ATTORNEY

Patented June 16, 1942

2,286,335

UNITED STATES PATENT OFFICE 2,286,335

INDICATOR

Rudolph S. Brescka and Edward C. Scott, Cranford, N. J., assignors to Western Electric Company, Incorporated, New York, N. Y., a corporation of New York Application March 13, 1940, Serial No. 323,740

3 Claims. (Cl. 264—12)

This invention relates to indicators, and more particularly to apparatus for indicating the rate of feed of articles or materials in inches per minute.

In machining some materials it is desirable, in some instances, that the operator cause the table, supporting the material, to feed the material at certain rates of speed. The desirable rates of speed may vary depending upon the kind of materials, their thickness and the type of operation performed thereon, and it has been found advantageous to provide means by which the operator may definitely control the rate of feed for each material according to the various requirements.

An object of the invention is to provide an indicator which is simple in structure and accurately dependable for indicating the rate of feed of articles or material.

With this and other objects in view, the invention comprises a feed indicator for indicating the rate of feed in inches per minute of an article, for example, a material supporting table of a material working apparatus, the feed indicators having a fluid moving element movable with the table to cause a fluid to travel through a conical tube at a rate depending upon the rate of movement of the table to move a rotor upwardly in the tube and position the rotor relative to a scale or graduations registering inches per minute, where it will indicate the rate of feed of the table.

Figure 1:
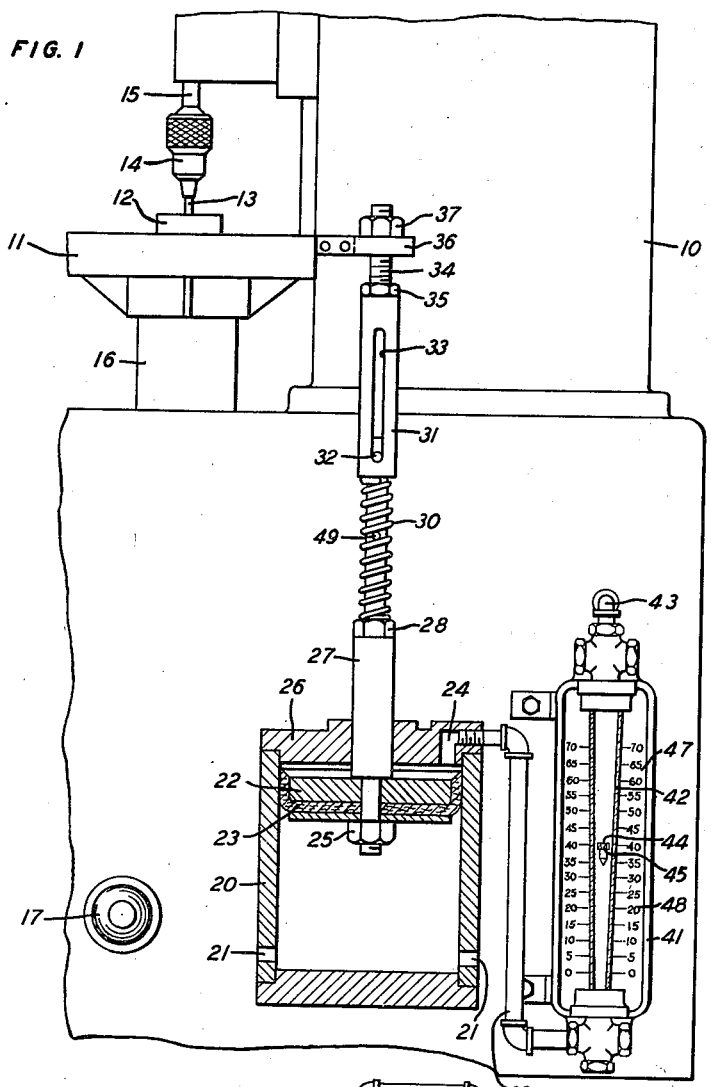
Figure 2:
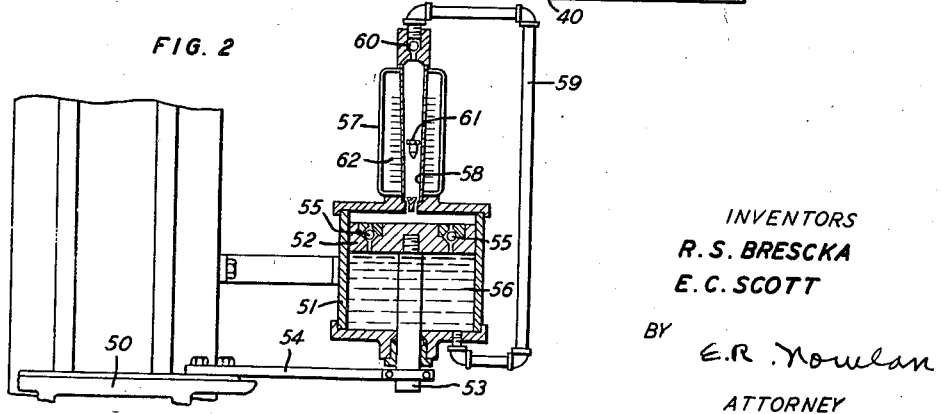

Other objects and advantages will be apparent from the following detailed description when taken in conjunction with the accompanying drawing, wherein Fig. 1 is a front elevational view of one species of the invention shown in combination with a material working machine, portions of the structure being shown in section; and Fig. 2 is a vertical sectional view of another species of the invention shown in cooperation with another type of material working machine.

Referring now to Fig. 1, the embodiment shown therein is associated with a drill press 10, one of the many machines or devices with which the feed indicator may be used. The drill press 10 has a table 11 to support material 12 and to move the material toward a tool 13 carried by a suitable tool support such as a chuck 14 of a spindle 15. In the present instance the table is mounted on a movable support 16, the latter being movable through hydraulic means controlled by a suitable valve not shown and varied, to vary the speed of travel of the table, by a valve 17. With such variable moving means the speed of movement of the table 11, to feed the material 12 to the tool, may be varied but it is important that the operator be able to set this moving means for accurate feeding speeds depending upon the type of material, the thickness thereof and the work performed thereon during the feeding of the material. By the aid of the feed indicator shown removably connected to the table 11 the operator may accurately adjust the table feeding means so that it will be moved at a definite speed to advance or feed the material a definite rate per minute.

In this embodiment the feed indicator consists of a cylinder 20 suitably mounted with respect to the press 10 and having inlet passageways 21 disposed therein adjacent the bottom thereof. A piston 22 is disposed in the cylinder and includes a shoe portion 23 of a structure that will permit a fluid, such as air, at atmospheric pressure, to bleed thereby during downward movement of the piston to allow the fluid to enter the cylinder above the piston, but will cause all the air above the piston to be moved toward an outlet 24 during upward movement of the piston. The piston has a rod 25 connected thereto at its center and extending through a head 26 of the cylinder in which the outlet 24 is disposed. The aperture in the head 26 through which the rod 25 passes is of sufficient size to slidably receive a sleeve 27 disposed concentric with the rod and held against movement relative to the piston by a nut 28. The connection between the sleeve 27 and the head 26 permitting relative movement of the sleeve in the head is such that no fluid will escape through the head other than through the outlet 24.

The rod 25 extends upwardly through a helical compression spring 30, the lower end of which rests on the nut 28 while the upper end abuts the lower surface of a tubular member 31. The rod 25 extends into the tubular member 31 a short distance, where a pin 32 carried by the rod is positioned to ride in diametrically opposed elongate slots 33 in the member. The upper end of the tubular member 31 is internally threaded to receive a stud 34 held in place by a nut 35 and conditioned to be removably connected to the table 11, through an outwardly extending yoke portion 36, by a nut 37.

Suitable fluid directing means, such as a pipe 40, affords communication between the outlet 24 and the lower end of an indicating unit 41. The indicating unit includes a conical transparent tube 42 communicating at its lower end with the pipe 40 and at its upper end with a suitable outlet 43. A rotor element 44 circular in cross section and of the general contour shown is disposed in the tube 42. The rotor 44 has a conically shaped lower end, while the upper end is enlarged, providing an annular portion in which slots 45 are formed of a desired angular structure to cause rotation of the rotor during the passage of a fluid through the tube. A member 47 supporting graduations 48 at definite spaced positions and increasing numerically from the lowermost zero indication cooperates with the rotor 44 to indicate the rate of feed of the material or table.

The operation of this embodiment of the invention is as follows.

Considering the structure in the position shown in Fig. 1, downward movement of the table 11 will cause downward movement of the piston 22 in the cylinder 20, allowing air at atmospheric pressure to pass around the piston and enter the cylinder above the piston. The operator then adjusts a table feeding means as nearly as possible, through the operation of the valve 17, to the desired rate of speed and then sets the mechanism in operation for moving the table upwardly. Through the upward movement of the table the piston 22 is moved upwardly, causing the air above the piston to be forced at a definite rate, depending upon the speed of movement of the table, through the outlet 24, the pipe 40 and upwardly through the tube 42. As the air moves upwardly through the tube the rotor is caused to rotate by means of the slots 45 therein and be moved upwardly depending upon the speed of travel of the air through the tube. The conical shape of the tube and the diameter of the rotor are such that little or no air can pass therebetween when the rotor is in the lowermost or zero position. Therefore, the rotor will be moved upwardly by the flow of air until the annular space between the periphery of the rotor and the inner wall of the tube is sufficient for the continued passage of the fluid through the tube. If the fluid is passing at a constant rate, which will occur during movement of the table at a constant rate of speed, the rotor will be raised to a position where it will register the rate of movement of the table through the rate of flow of the fluid. If the rate of feed in inches per minute of the table is desired to be forty inches per minute and this adjustment has been reached during the first test in setting the press, no further adjustments need be made. However, if the operator wishes the table to move fifty inches per minute he will know from the indicating unit that he must increase the speed of travel of the table ten inches per minute. The operator, therefore, watches the rotor 44 during upward movement of the table and makes the necessary additional adjustments of the valve 17 to vary the table feeding means until the rotor registers with the graduation 48 indicating fifty inches per minute.

If after the first adjustment the operator wishes the table to move at a slower rate of speed, he knows, by viewing the indicating unit which way the valve 17 must be turned to accomplish this result. He, therefore, adjusts the valve 17 as the table moves upwardly, watching the indicating unit until the table moving means has been adjusted to move at the desired rate registered by the rotor 44 and the graduations 48. After the table moving mechanism has been adjusted to the rate of movement desired, the feed indicating means may be disconnected from the table by removing the nut 37. This connecting means of the piston with the table may be reduced in length by compressing the spring 30 and inserting suitable means, such as a pin, through the slots 33 and an aperture 49 in the rod 25.

The embodiment of the invention shown in Fig. 2 is similar in principle to that shown in Fig. 1 excepting that this structure is designed to use a liquid, while the structure shown in Fig. 1 was primarily designed to use air at atmospheric pressure. In Fig. 2 a table 50 of a material working machine is moved through any desired variable moving means similar to that described for the structure in Fig. 1. A cylinder 51 is rigidly mounted and has a piston 52 disposed therein and connected to the table through a piston rod 53 and a suitable yoke 54. In this embodiment valves 55 are disposed in the piston to allow a fluid 56 in the cylinder 51 to pass therethrough when the piston is moved downwardly and to prevent passing of the fluid through the piston when the piston is moved upwardly. In this embodiment an indicating unit 57 is mounted upon the cylinder and includes a conical tube 58 of transparent material having its lower end disposed in communication with the cylinder, while its upper end communicates with a by-pass 59 through a valve 60. A rotor 61 identical in structure with the rotor 44 of Fig. 1 is disposed in the conical tube 58 and cooperates with marked graduations 62 positioned adjacent the tube to indicate the rate of feed in inches per minute of the table 50 or material supported thereby. The operation of the structure shown in this embodiment is substantially identical to that of the embodiment shown in Fig. 1 with the exception that here a liquid is used repeatedly to indicate the rate of feed of the table.

In operation when the table is moved the piston is moved downwardly in the cylinder, causing the fluid beneath the piston to pass through the valves 55 into the cylinder above the piston, this liquid being prevented from traveling upwardly through the by-pass due to the valve 60. When the table is moved upwardly the piston will also be moved upwardly, forcing the fluid through the conical tube 58 at a rate depending upon the rate of movement of the table, causing the rotor 61 to rotate and move upwardly where the adjacent graduation will register the rate of feed of the table. This operation may be continued until the means for moving the table has been adjusted, through a valve similar to the valve 17 of Fig. 1, until the desired rate, depending upon the type of material, the thickness thereof and the operation performed on the material has been reached. After this has been accomplished and it is desirable to disconnect the indicating means from the table this may be done by removing the yoke 54.

The embodiments of the invention herein disclosed are merely illustrative and may be widely modified and departed from in many ways without departing from the spirit and scope of the invention as pointed out in and limited solely by the appended claims.

What is claimed is:

1. An indicator for a reciprocable article comprising a cylinder having fluid inlet and outlet ports, an indicating unit having a transparent tubular member with a vertical passageway for the passage of a fluid forced from the cylinder through the outlet, a by-pass connecting the tubular member with the inlet port, a piston in the cylinder movable alternately in opposed directions by a reciprocable article to force a fluid on one side of the piston through the outlet port, the tubular member and the by-pass to the other side of the piston at a rate dependent upon the speed of movement of the article and piston in one direction, graduations disposed adjacent the passageway, and an element disposed in the passageway and moved vertically therein by the fluid a distance dependent upon the rate of movement of the fluid to cooperate with the graduations to indicate the speed of movement of the article.

2. The combination with a material working machine having a reciprocal support and means to alternately move the support in a feeding direction and a return direction, of a transparent fluid passageway, graduations disposed adjacent thereto, means movable with the support to force a fluid through the passageway during movement of the support in the feeding direction, and an element disposed in the passageway and caused to move distances by the fluid, relative to the graduations, variable with variations in the speed of movement of the support to indicate the speed of movement of the support in the feeding direction.

3. An indicator for a reciprocable article comprising a cylinder having air inlet and outlet ports, an indicating unit having a transparent tubular member with a vertical passageway for the passage of air forced from the cylinder through the outlet port, a piston in the cylinder movable in alternately opposed directions by a reciprocable article to force air on one side of the piston through the outlet port and the tubular member at a rate dependent upon the speed of movement of the article and piston in one direction, graduations representing inches per minute disposed adjacent the tubular member, and an element disposed in the passageway and moved vertically therein by the air passing therethrough a distance dependent upon the rate of movement of the air to cooperate with the graduations to indicate the speed of movement of the article.

RUDOLPH S. BRESCKA.
EDWARD C. SCOTT.